United States Patent [19]
Karow

[11] Patent Number: 5,117,779
[45] Date of Patent: Jun. 2, 1992

[54] VERTICAL SUPPORT MOUNTED BIRD BATH

[76] Inventor: Terry A. Karow, Rte. #3, Box 89, Creedy Rd., Beloit, Wis. 53511

[21] Appl. No.: 699,989

[22] Filed: May 13, 1991

[51] Int. Cl.[5] ............................................. A01K 29/00
[52] U.S. Cl. ..................................... 119/69.5; 248/231
[58] Field of Search .................. 119/69.5, 61, 57.8; 248/231, 310, 218.4, 219.1, 239, 122

[56] References Cited

U.S. PATENT DOCUMENTS

| | | | |
|---|---|---|---|
| D. 146,901 | 6/1947 | Fiorio | D35/3 |
| D. 159,441 | 7/1950 | Primavera | D35/3 |
| D. 171,020 | 12/1953 | Anderson | D91/4 |
| D. 179,842 | 3/1957 | Flynn | D31/2 |
| D. 204,388 | 4/1966 | Mitchell | D31/2 |
| D. 301,776 | 6/1989 | Ochs | D30/123 |
| 1,881,065 | 10/1932 | Shirley | 119/61 |
| 2,887,988 | 5/1959 | Cottongim | 119/69.5 |
| 2,938,495 | 5/1960 | Hinton | 119/69.5 |
| 3,115,213 | 12/1963 | Cloutier | 248/231 |
| 3,195,510 | 7/1965 | Bernstein | 119/61 |
| 3,537,429 | 11/1970 | Regan | 119/51.03 |
| 3,785,604 | 1/1974 | Steck | 248/231 |
| 3,995,591 | 12/1976 | Garwood | 119/69.5 |
| 4,013,251 | 3/1977 | Cleveland | 248/310 |
| 4,666,118 | 5/1987 | Busche | 248/218.4 |
| 4,976,223 | 12/1990 | Pierce | 119/61 |

FOREIGN PATENT DOCUMENTS

| | | | |
|---|---|---|---|
| 67401 | 5/1929 | Sweden | 119/57.8 |
| 915480 | 1/1963 | United Kingdom | 119/57.8 |

*Primary Examiner*—Robert P. Swiatek
*Assistant Examiner*—Todd E. Manahan

[57] ABSTRACT

A bird bath of the type that can be mounted to an elongated vertical support member comprises a the bowl (12) which is shallow and has a circular indentation to accommodate the shape of a tree, or any other vertical support. The bowl (12) is further constructed to have an engaging boss portion (10) situated on the undersurface (13). The engaging boss portion (10) is joined, and secured, to an elongated horizontal arm member (14), and to a diagonal leveling device (16). For ease of cleaning and emptying, the bowl pivots forward and away from the vertical support. This is done by removing locking mechanism (18B), and allowing fastening agent (18A) to serve the function of a hinge; even when bowl is in pivoted position, it is still securely attached to arm member (14). When locking mechanism (18B) is reinstated, it holds bowl (12) in horizontal position; the locking mechanism is of the type that it can be disassembled, removed, reassembled, and reinstated repeatedly without suffering significant damage. The arm member (14) projects back towards vertical support and engages with a mounting apparatus (22A). A belt (24A), intertwining with mounting apparatus (22A), is equipped with a buckle (26A) at one end that receives and secures the opposite end of the belt. Leveling device (16) projects back and downward towards vertical support and engages with mounting apparatus (22B). A belt (24B), intertwining with mounting apparatus (22B), is equipped with a buckle (26B) at one end that receives and secures the opposite end of the belt. The belts horizontally encircle the vertical support, and they allow substantial adjustment to accommodate the circumference.

7 Claims, 4 Drawing Sheets

VERTICAL SUPPORT MOUNTED BIRD BATH

BACKGROUND OF THE INVENTION

1. Field of the Invention

This invention relates in general to bird baths, specifically, to such bird baths that may be mounted on a vertical support such as a tree.

2. Descripiton of the Prior Art

It has long been known that one of the simple pleasures of life is having the opportunity to view wildlife in their free state. At this time, in many areas this is difficult because of the loss of natural habitat which wildlife has suffered due to farming or development. As a result, many have utilized a bird bath to attract and induce birds to freaquent an area. This affords one the opportunity to commune with nature from the comfort of one's own home. Another benefit of providing a bird bath is the fact that it attracts a wide variety of birds to a site; these birds are observed in their natural environment. Therefore, one develops a deep appreciation for nature in general and the role birds play in nature.

Heretofore, bird baths consisted of a shallow bowl held in an elevated position with a vertical bearing mounted centrally to the bottom of the bowl. There have been many designs for bird baths; however, many of these changes in design have primarily ornamental. They have done little to change the construction mentioned.

The bird baths presently on the market make it difficult to manicure the ground at the base; it is necessary to empty and move them, or trim around the base. It is difficult to tip, empty, or move some of the heavier concrete models; this is particularly true if the owner is elderly or handicapped. Also, the heavier models may cause injury if they are tipped over onto an individual. Many of the inexpensive plastic models do not maintain a uniform water level. Furthermore, the ground beneath the present models must be excavated to ensure the bowl is level; adjacent landscaping or grass is damaged. In addition, the present models are not adjustable in height and allows children or pets to be exposed to any contaminated water contained in the bird bath. Children and pets are also exposed to contaminated water because it is possible to tip over a bird bath with a singular vertical bearing mounted on the mounted on the bottom of the bowl. The construction of the present invention minimizes many of the disadvantages of the bird baths presently being offered.

Bird baths are very well known, and inventors have created several designs in an effort to induce birds to remain in an area. Bird baths should be of simple construction, convenient to maintain and replenish, and manufactured so it is easily shipped and assembled. However, there is a serious shortcoming in the present design of many of them.

U.S. Pat. No. 2,938,495 to Hinton (1957) discloses a spray of water that is forced through a tube and released when a bulb-like device is squeezed. This will be very difficult to use in a natural atmosphere since most birds will not let one that close to them. The present invention allows one to view birds in a natural and nonintrusive manner.

U.S. Pat. No. 2,887,988 to Cottongim (1956) discloses a combined bird bath and feeding station. The upper portion is "U" shaped and has two bowls mounted on it. The "U" is attached at the bottom to a vertical bearing and has a base that rests directly on the ground. U.S. Pat. No. Des. 204,388 to Mitchell (1966) discloses a portable bird bath with a bowl mounted on a vertical support member with a lower ground engaging portion. Because of the construction of these bird baths, they appear to be somewhat top heavy. This renders them unstable in extreme weather conditions, or if the ground beneath is not level. The present invention is securely mounted to a vertical support to add increased stability.

U.S. Pat. No. Des. 179,842 to Flynn (1957) discloses a fountain for birds. The function is in question due to the fact there is no mention of how the water for such a fountain is supplied, or how the fountain itself will function. The present invention utilizes a simpler, proven bowl; yet, it improves considerably on the traditional methods of elevating the bowl.

U.S. Pat. Nos. Des. 301,776 to Ochs (1989), Des. 171,020 to Anderson (1953), Des. 159,441 to Primavera (1950), and Des. 146,901 to Fiorio (1947) are all of ornamental design. Although the elevated verticle bearing may differ in some minor ways, they all consist of a shallow bowl elevated on a vertical bearing mounted centrally to the bottom of the bowl. The entire unit is free standing. To maintain the ground around the base it is necessary to empty and move, or trim around the bird bath with a weeding device. In either case, it is more difficult and time consuming than it need be. Also, because there is no adjustment in height and the possibility that it may be tipped over, there is a risk that children or pets are exposed to any contaminated water contained in the bowl. The present invention minimizes these inconveniences.

U.S. Pat. No. 3,537,429 to Regan (1970) discloses a tree mounted animal and bird feeder; however, this feeder is attached to the tree with large nails that penetrate deeply into the tree. This may create damage to the tree on which it is mounted, or limit the the variety of vertical supports that may be used. The present invention utilizes belts that are adjusted to accomodate the girth of the vertical support of the growth of a tree; in addition, it does not damage the tree as the penetrating nails may.

Although the patents contained herein have some ornamental or intrinsic qualities, they do little to aid in the convenience of manicurring the ground, ease of cleaning, or maintaining a uniform water level. Whatever the precise merits, features and advantages of the above cited references, none of them achieves or fulfills the purposes of the vertical support mounted bird bath of the present invention.

My own invention describes a bowl adapted to rest securely on a horizontal arm member that is braced by a leveling device. The entire assembly affixes to a tree, or to an elongated support that stands perpendicular to the ground, and is secured by belts of adjustable length encircling the vertical support. This invention overcomes several of the disadvantages of the bird baths that are presently avilable. Heretofore, all of the bird baths presently on the market suffer from a number of disadvantages:

(a) Maintaining the grass beneath is difficult and time consuming because the bowl must be emptied and moved, or a weeding device must be used.

(b) The ground must be excavated to ensure the bowl is level; adjacent landscaping is damaged.

(c) To clean, it is necessary to tip and empty; this is difficult with some of the heavier concrete models. Also, with the heavier models this is a hardship for the elderly or handicapped individual to maintain. In addition, if these were to fall onto someone bodily injury may occur.

(d) With some of the inexpensive plastic models the bowl does not remain level; this doesn't allow the maximum amount of water being retained in the bowl.

(e) In the previous models the height is not adjustable, and allows children or pets to be exposed to contaminated water.

(f) With the present bird baths available, it is possible for small children or pets to tip them over; this too, exposes them to any contaminated water contained in the bowl.

(g) The grass beneath the base of the existing bird baths may be killed, or to a lesser extent, damaged.

SUMMARY OF THE INVENTION

Broadly, it is an object of the present invention to provide a bird bath which overcomes the shortcomings of known devices. It is specifically an object of the present invention to provide an apparatus of this type which is conveniently filled and cleaned. Accordingly, besides the objects and advantages of the vertical support mounted bird bath described in my above patent, there are additional objects and advantages which include:

(a) to provide a bird bath that is mounted on a wide variety of vertical supports, which includes trees of various sizes and shapes;

(b) to provide a bird bath that does not damage the vertical support by penetration of securing devices, and has belts that are adjustable to accommodate the vertical support girth;

(c) to provide a bird bath that is easily and efficiently cleaned because the bowl may be tipped at a pivot point, yet, is still securely attached to a horizontal arm member;

(d) to provide a bird bath that is not emptied and moved to maintain the grass around the base;

(e) to provide a bird bath that does not damage the grass or landscaping under the base;

(f) to provide a bird bath that dosen't require the ground beneath to be excavated to maintain a uniform water level;

(g) to provide a bird bath that utilizes a leveling device to keep the bowl level maximizing the volume of water being retained in the bowl;

(h) to provide a bird bath that is adjustable in height allowing it to be raised reducing the possibility of children or pets being exposed to any contaminated water; and (i) to provide a bird bath that employs a locking device, in place, it will be difficult for children or pets to tip the bowl; therefore, the risk of spilling and being exposed to contaminated water is lessened.

Further objects and advantages are to provide a bird bath that has ease of cleaning, ease of leveling, and does not damage either the tree or the grass beneath, which is relatively inexpensive to manufacture, and is easily shipped and assembled with basic tools, which is simple and conveniently used to supply birds with life sustaining water, which is used on a wide variety of vertical supports, which maintains a uniform water level for maximum water retention, and which provides personal enjoyment to one veiwing birds in their free state. Still further objects and advantages will become apparent from a consideration of ensuing description and drawings.

BRIEF DESCRIPTION OF THE DRAWINGS

The foregoing and further objets, advantages, and features of the present invention will be more completely understood from a detailed description of presently preferred, but nonetheless illustrative, embodiments of the present invention, with references being made to the accompanying drawings in which.

REFERENCE NUMERALS IN DRAWINGS

In drawings, closely related parts have the same number but different alphabetic suffixes.

9 receiving compartment of bowl #12
10 engaging boss portion of bowl #12
11 sloping wall of bowl #12
12 bowl
13 undersurface of bowl #12
14 elongated horizontal arm member
16 diagonal leveling device
18A fastening agent
18B locking mechanism
20A and 20B bolts
22A and 22B mounting apparatus
24A and 24B belts
26A and 26B buckles
28A and 28B clasps
30A and 30B washers
32A and 32B nuts
34A and 34B holes used at pivot point
36A and 36B holes used at locking mechanism
38A and 38B holes in arm member #14
40 cylindrical opening in horizontal arm member #14
42 and 44 cylindrical openings in diagonal leveling device #16
46A, 46B, 50A, and 50B vertical slots in their respective mounting apparatus
48A, 48B, 52A, and 52B holes in projection portion of their respective mounting apparatus
58 elongated vertical support member

DETAILED DESCRIPTION OF THE PREFERRED EMBODIMENTS

Figure 1:
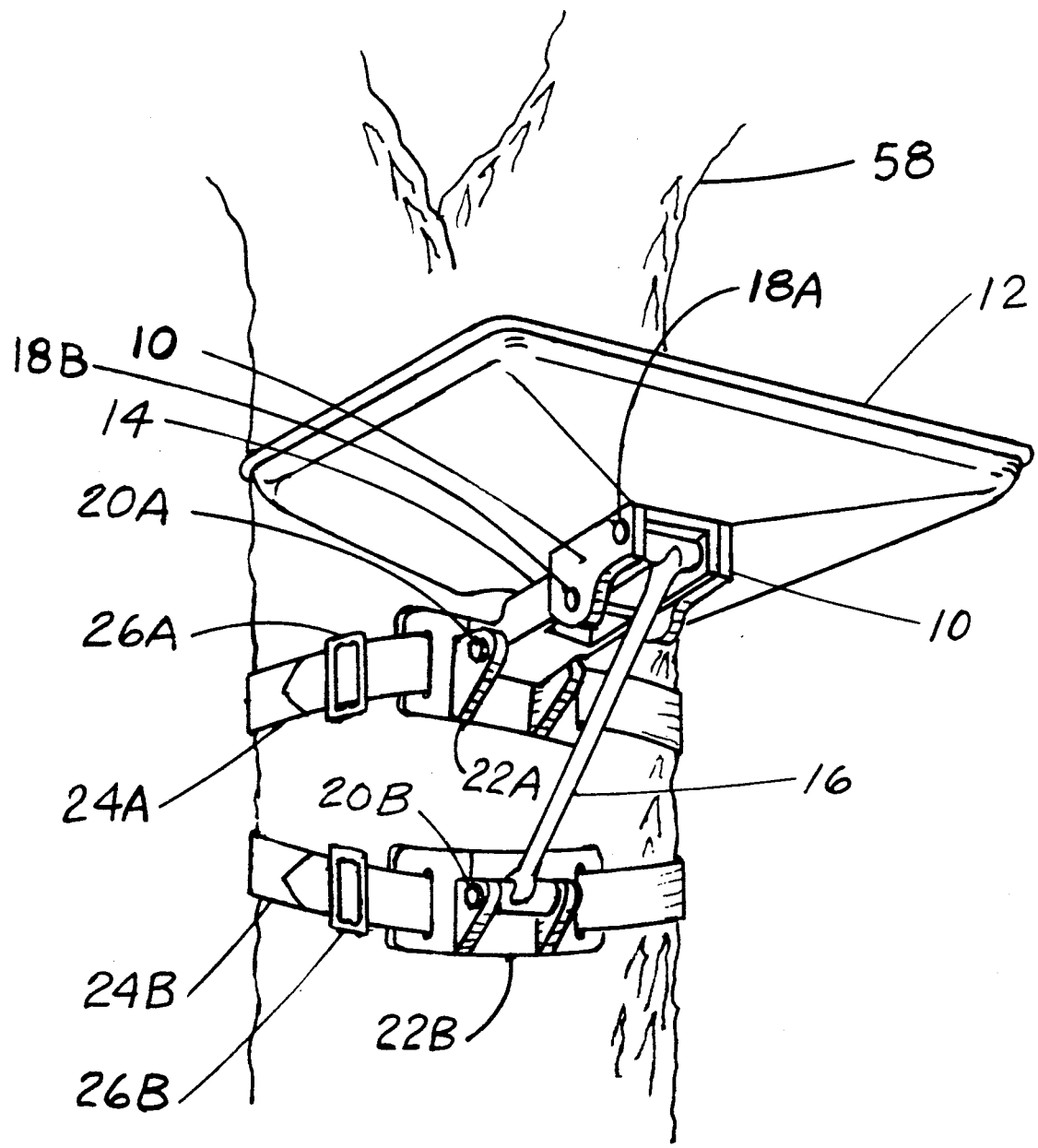
FIG. 1 is an isometric view of a vertical support mounted bird bath in accordance with the present invention, with the bird bath assembled and mounted to a verticle support.
Figure 3:
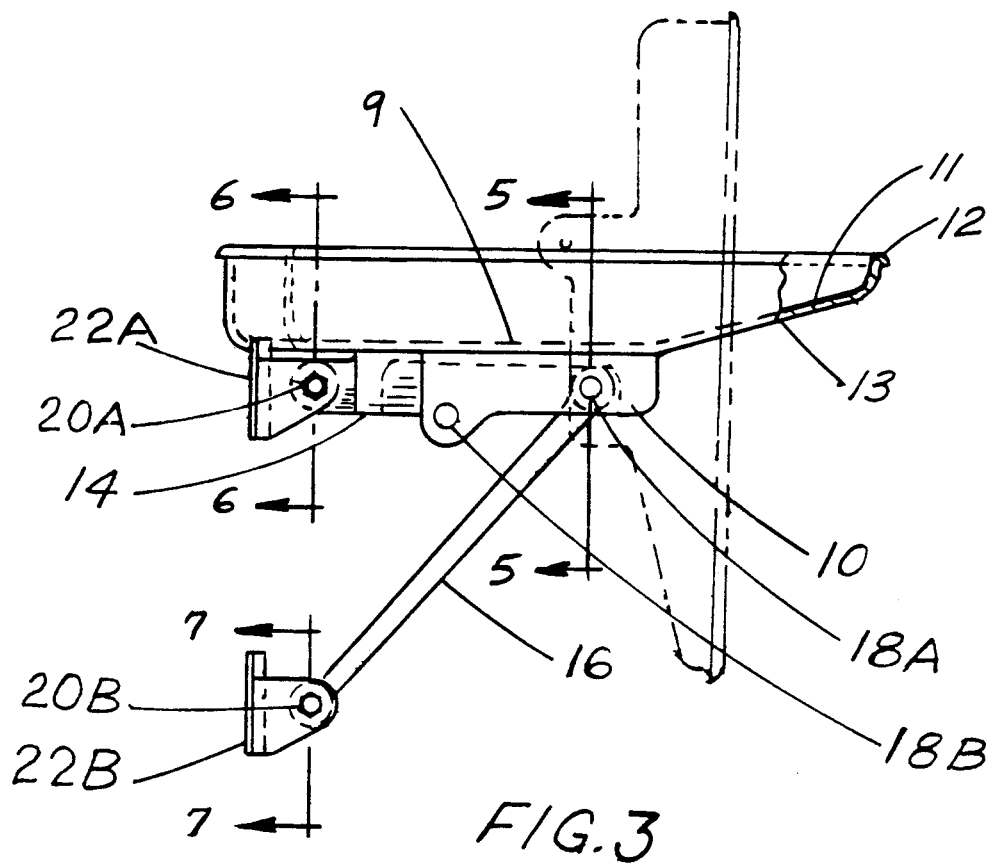
FIG. 3 is a left side view of the assembled unit, and displays the pivotal movement of the bowl.
Figure 4:
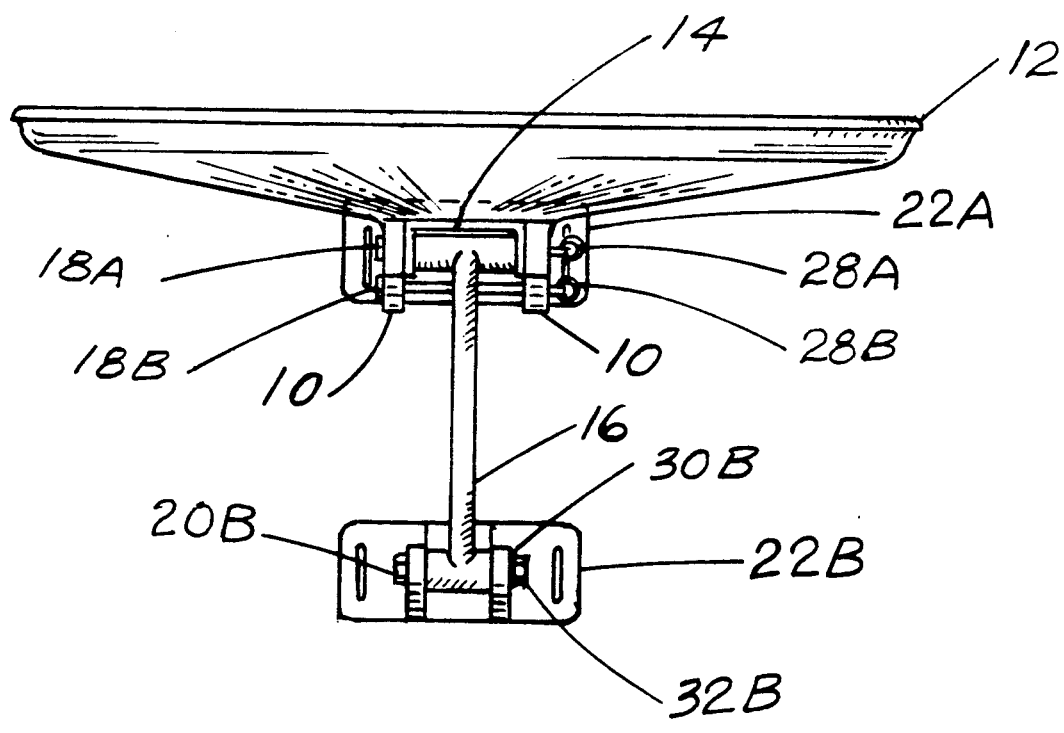
FIG. 4 is a front view of the assembled unit.

A typical embodiment of a vertical support mounted receptacle fro containing liquid or dry materials of the present invention is illustrated in FIG. 1 (lower view), FIG. 3 (side view), and FIG. 4 (front view). The preferred embodiment comprises a vertical support mounted bird bath, useful in providing life sustaining water for birds over extending periods of time. The present invention is constructed of rigid matereials that are able to withstand adverse weather conditions, without suffering significant deterioration. These materials may include plastic, fiberglass, or other similar material appropriate for such construction. In accordance with this invention, a bowl 12 comprises a bottom wall 11 and a receiving compartment 9 of which bottom wall 11 slopes upwardly away from the center of the bottom wall and receiving compartment 9. Bowl 12 is a storage container that is filled with water periodically, and serves as a reservoir from which birds bathe or drink; furthermore, bowl 12 is dimensioned to receive a generous quantity of water.

FIGS. 1, 2, 3, 4, and 5 illustrate that bowl 12 is constructed with an engaging boss portion 10 at the center of its undersurface 13. Engaging portion 10 allows an elongated horizontal arm member 14 to fit snugly between bosses of engaging portion 10. An elongated deownward diagonal leveling device 16 has an upper clindrical opening end 42 that fits snugly between flanges of arm member 14, and aligns with a set of holes 38A and 38B of arm member 14. Engaging portion 10 of bowl 12 has a set of holes 34A and 34B that align with holes 38A and 38B of arm number 14, and cylindrical opening 42 of leveling device 16. A fastening agent 18A is inserted through holes 34A and 38A, cylindrical opening 42, and holes 34B and 38B; fastening agent 18A is secured by a clasp 28A. Clasp 28A is of the nature that it can be removed, and reinstated repeatedly without suffering significant damage.

FIGS. 1, 2, 3, 4, and 5 show engaging portion 10 constructed having bosses extending beyond bottom of arm member 14; and a second set of holes 36A and 36B situated and positioned below arm member 14. A locking mechanism 18B is inserted through hole 36A, under arm member 14, and through hole 36B and secured by a clasp 28B.

Figure 2:
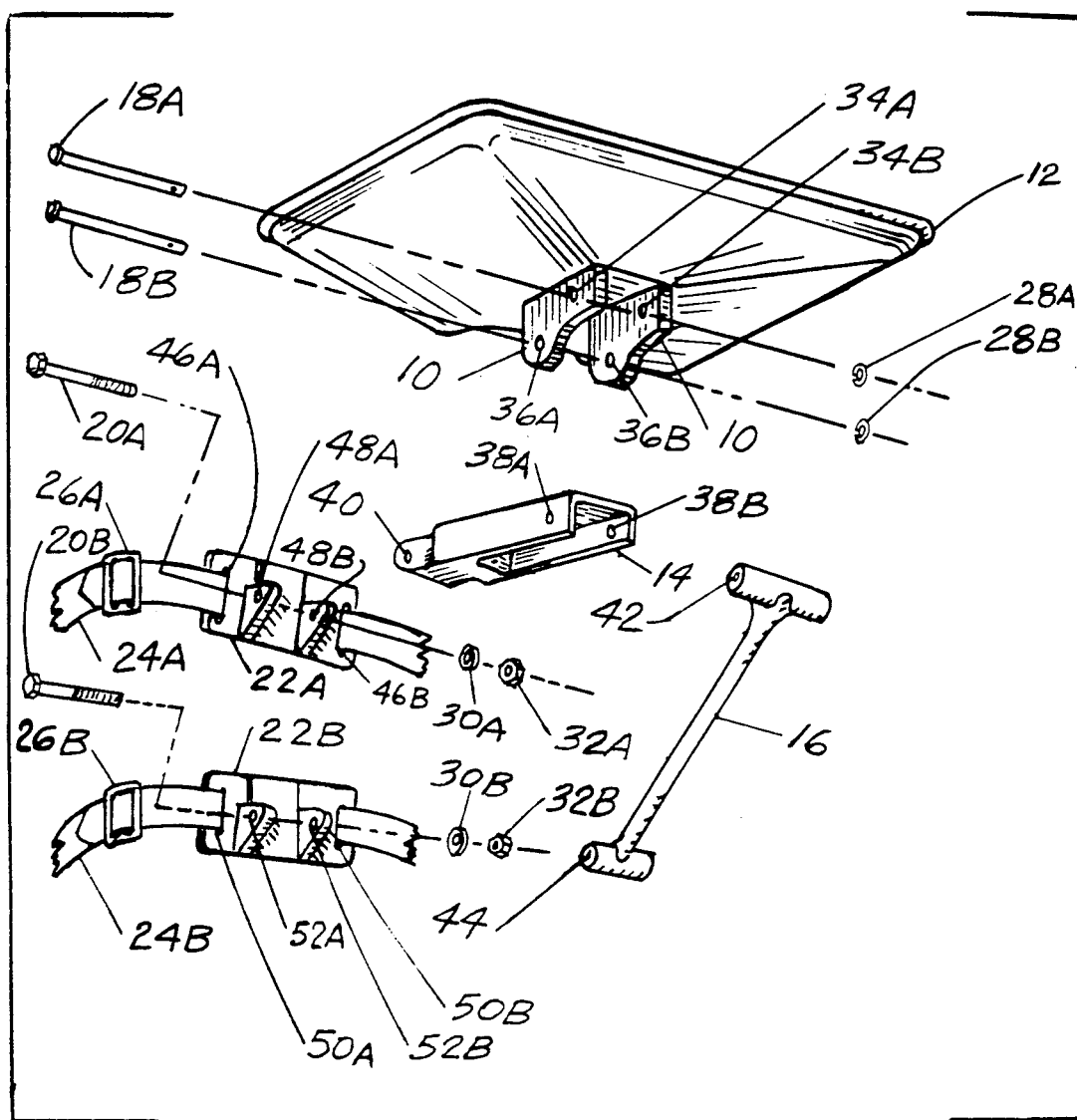
FIG. 2 is an exploded view with respect to FIG. 1, with all parts shown.

FIGS. 2 and 3 display bowl 12 constructed to pivot forward, and away from an elongated vertical support member 58, which directs water leaving bowl 12 in a downward direction. Fastening agent 18A is used as a hinge or ease of cleaning when locking mechanism 18B is removed allowing for pivotal action. Pivoting action occurs only when locking mechanism 18B is removed, thus allowing 18A to be the pivot point. When locking mechanism 18B is reinstated through holes 36A and 36B of engaging portion 10, positioned under arm member 14, locking mechanism 18B is secured with clasp 28B. Insertion of locking mechanism 18B, and securing by clasp 28B, will serve the function of a locking pin and safety agent; this keeps bowl 12 horizontally stationary so it is not tipped at pivot point. Locking mechanism 18B and clasp 28B may be disassembled, removed, reinstated, and assembled repeatedly without suffering substantial adverse effects.

Arm member 14 projects back towards vertical support 58 as shown in FIGS. 1, 2, and 3. A cylindrical opening 40 of arm member 14 aligns with a set of holes, 48A and 48B of engaging projection portion, of a mounting apparatus 22A. A bolt 20A is inserted through hole 48A, through cylindrical opening 40, and through hole 48B and secured with a washer 30A and a nut 32A. This is best illustrated in FIGS. 2 and 6.

Figure 6:
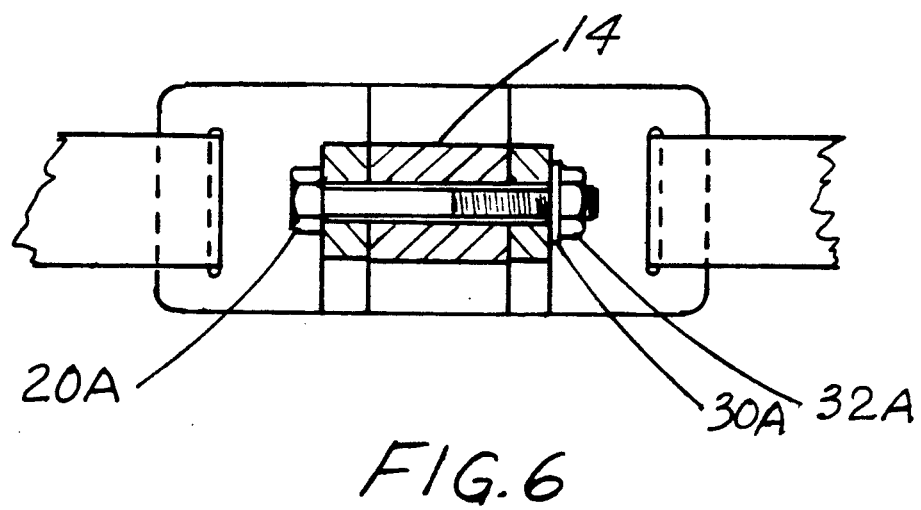
FIG. 6 is a fragmentary sectional view of the upper mounting apparatus joining the horizontal arm member, through the use of fastening agent as seen in 6—6 in FIG. 3 and looking in the direction of the arrows.

A belt is joined to mounting apparatus 22A by inserting belt 24A into a vertical slot 46A and out a vertical slot 46B of mounting apparatus 22A as illustrated in FIGS. 2 and 6. Belt 24A is equipped with a buckle 26A at one end that receives and secures opposite end of belt 24A as shown in FIG. 2. Belt 24A horizontally attaches and encircles vertical support 58 as displayed in FIG. 1, allowing substantial adjustment in length of belt 24A to accommodate the circumference of vertical support.

Figure 7:
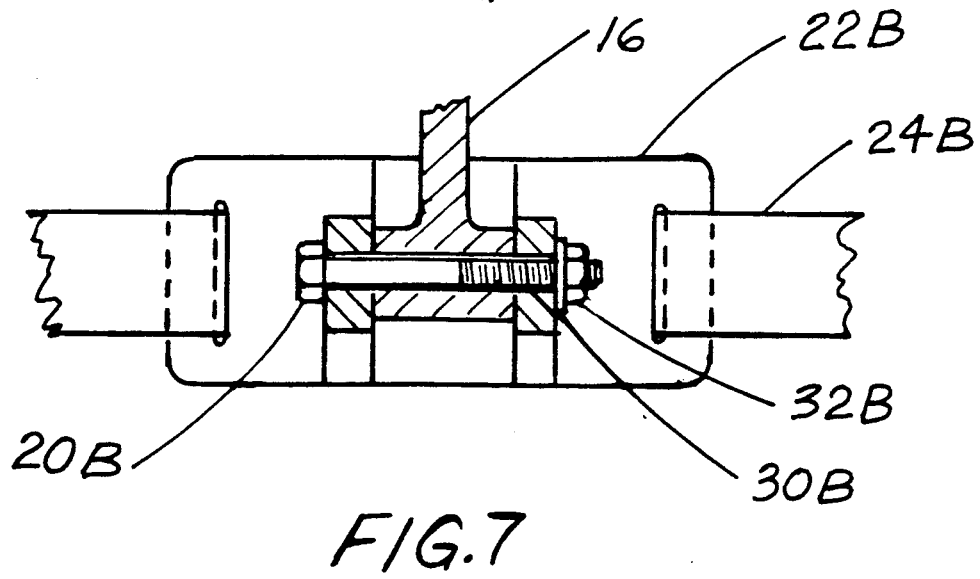
FIG. 7 is a fragmentary sectional view of the lower mounting apparatus joining the leveling device, through use of a fastening agent as seen in 7—7 in FIG. 3 and looking in the direction of the arrows.

Leveling device 16 projects back towards vertical support 58 as shown in FIGS. 1 and 3. A cylindrical opening 44 of leveling device 16 aligns with a set of holes, 52A and 52B on engaging projection portion, of a second mounting apparatus 22B as shown in FIGS. 2, 4, and 7. A bolt 20B is inserted through hole 52A, through cylindrical opening 44, and through hole 52B, and secured with a washer 30B and a nut 32B.

A second belt 24B is joined to mounting apparatus 22B by inserting belt 24B into a vertical slot 50A and out of a second vertical slot 50B of mounting apparatus 22B as illustrated in FIGS. 2 and 7. Belt 24B is equipped with a buckle 26B at one end that receives and secures the opposite end of belt 24B. Belt 24B horizontally encircles vertical support 58 as shown in FIG. 1. There is substantial adjustment in length of belt 24B to accommodate the circumference of vertical support.

The bird bath bowl 12, arm member 14, leveling device 16, and component parts necessary for assembly may be manufactured of molded plastic, fiberglass, metal, or other appropriate materials. Belts 24A and 24B may be made of plastic, vinyl, nylon, rubber, or other materials suitable for providing adequate strength to ensure that bird bath assembly adheres securely to vertical support 58. Buckles 26A and 26B may be of the serrated nature, or other types that effectively receive, allow for adjustment, and secure respective belts. These materials may be used in any combination, or in the entirety of the present invention.

The entire present invention may be manufactured allowing it to be shipped unassembled, in the form of a kit, and readily assembled and satisfactorily operated by purchaser without the use of complicated tools.

OPERATION—FIGS.

In use, bowl 12 is conveniently tipped at a pivot point, utilizing fastening agent 18A which functions as a hinge. This is illustrated in FIG. 3. For pivotal action it is necessary to remove locking mechanism 18B. This is done easily by removing clasp 28B from the end of mechanism 18B (FIGS. 4 and 5), and just sliding mechanism 18B out. This allows bowl 12 to pivot forward, and away from vertical support 58, and directs water leaving bowl 12 in a downward direction. In this pivoted position, bowl 12 is somewhat perpendicular to the ground. This aids in the ease of emptying, cleaning, and hosing out; yet, the engaging portion 10 of bowl 12 is still securely attached to arm member 14 through the use of fastening agent 18A. Upon completion of cleaning, bowl 12 is placed in the orginal position resting on arm member 14 as shown in FIG. 1. It is necessary to reinsert locking mechanism 18B through holes 36A and 36B and under arm member 14, and affix clasp 28B to end of mechanism 18B (see FIG. 5). The bowl is conveniently filled from a garden hose or the like.

Figure 5:
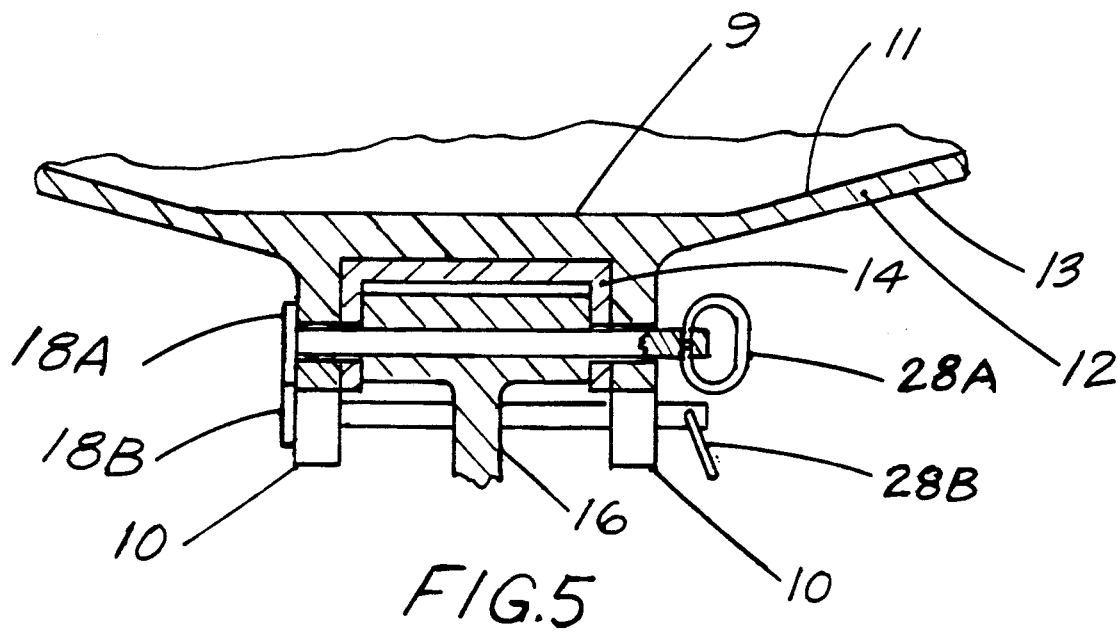
FIG. 5 is a fragmentary sectional view through the pivot point as in 5—5 in FIG. 3 and looking in the direction of the arrows.

To assemble, holes 34A and 34B, situated on bosses of engaging portion 10, are aligned with holes 38A and 38B of arm member 14 and cylindrical opening 42 of leveling device 16 (see FIGS. 2, 3, and 5). Fastening agent 18A is inserted through aligned openings and secured by clasp 28A. Arm member 14 projects back and attaches to mounting apparatus 22A. Arm member 14 is attached by placing cylindrical opening 40 between holes 48A and 48B of engaging projection portions of mounting apparatus 22A; inserting bolt 20A through respective opening; and securing the threaded end with washer 30A and nut 32A (see FIG. 6). Belt 24A is interwoven with mounting apparatus 22A by placing belt 24A into vertical slot 46A and out of vertical slot 46B. Belt 24A has buckle 26A at one end that receives and secures the opposite end of belt (see FIG. 1). Belt 24A encircles vertical support 58, allowing substantial room for adjustment to accommodate the girth of vertical support (see FIG. 1).

Leveling device 16 projects backwardly and downwardly to mounting apparatus 22B. Leveling device 16 is attached by placing cylindrical opening 44 between holes 52A and 52B of engaging projection portion of mounting apparatus 22B (see FIG. 2); inserting bolt 20B through respective opening; and securing the threaded end with washer 30B and nut 32B (see FIG. 7). Belt 24B is interwoven with mounting apparatus 22B by placing belt 24B in vertical slot 50A and out of vertical slot 50B. Belt 24B has buckle 26B at one end that receives and secures the opposite end of belt (see FIG. 1). Belt 24B horizontally encircles vertical support, and allows substantial room for adjustment to accommodate the girth of vertical support (see FIG. 1)

Belt 24A is first attached at the desired height to the vertical support and then belt 24B is attached, because this is connected to diagonal leveling device 16. By raising the height of belt 24B on vertical support, leveling devcice 16 pushes up on the bottom of bowl 12 at engaging portion 10; this raises the outermost rim of bowl 12. By lowering the height of belt 24B on vertical support, leveling device 16 pulls down on bottom of bowl 12 at engaging portion 10; this lowers the outermost rim of bowl 12. This adjustment is particularly useful if the vertical support is crooked, or to some extent bent; this aids the owner in leveling the bird bath.

The entire bird bath apparatus is assembled quickly and easily, using basic hand tools, and the steps stated herein. It is just as easily disassembled by reversing the assembly process. This is preferred for the purpose of facilitating convenient transfer of the bird bath of this invention from one location to another.

Although the preferred embodiments of the invention are disclosed for illustrative purposes, those skilled in the art will appreciate that many additions, modifications, and substitutions are possible, without departing from the scope and spirit of the invention and defined in the claims at the end hereof.

Accordingly, the reader will see that the vertical support mounted bird bath of this invention is used to provide birds with necessary water, is used easily and conveniently, does not damage the vertical support, or the grass beneath it, is mounted on a wide variety of vertical supports, and provides easy and efficient cleaning due to the pivoting action of the bowl. Furthermore, the locking device on the undersurface of the bowl reduces the risk of contaminated water being spilled on children or pets, and the height of the bowl on the vertical support allows bowl to be raised to impede children or pets from being exposed to polluted water. In addition, it is no longer necessary to empty and move the bird bath to mow the grass surrounding it; this is particularly helpful for an individual that has difficulty in lifting. The threat of a child being injured by tipping a heavy bird bath on themselves is reduced. Finally, it is no longer necessary to excavate the ground to ensure the bird bath is level.

Although the description above contains many specificities, these should not be construed as limiting the scope of the invention but mearly providing illustrations of some of the presently preferred embodiments of this invention. For example the bowl may be used to contain solid materials, such as birdseed, by simply adding holes for drainage so water does not accumulate. The bowl may also have the circumference narrowed and the depth increased to accommodate plants; these planters may be equipped with, or without, drainage holes. Another advantage of the present invention is the height from the ground, and the shape of the bowl, may be modified to serve as a stationary pet bowl for food or water. Also, by replacing the bowl with a flat surface, the present invention may accommodate condiments, or serve as a platform for potted plants. Finally, the size, shape, and contour of the bowl may vary; the color of the entire invention may vary, either in part or as a whole; the bird bath may be constructed of plastic, metal, fiberglass, or other suitable materials; and the fastening agent or locking mechanism with circular clasp used in assembling parts may be replaced with a threaded bolt and nut, or similar items used in assembly. Thus the scope of the invention should be determined by the appended claims and thier legal equivalents, rather than the examples given.

I claim:

1. A receptacle for containing liquid or dry materials attached to an elongated vertical support member, comprising:
    a bowl having an engaging boss portion located at an undersurface of said bowl;
    an elongated horizontal arm member;
    a leveling device;
    a fastening agent connecting said engaging boss portion of said bowl to said elongated horizontal arm member and said leveling device, such that said bowl is pivotable with respect to said elongated horizontal arm member;
    a locking mechanism removably attached to said engaging boss portion of said bowl for preventing pivotal movement of said bowl; and
    a means for attaching said elongated horizontal arm member to said elongated vertical support member so as to support said bowl in a horizontal position.

2. The receptacle of claim 1 wherein said bowl has a bottom wall and receiving compartment of which said bottom wall slopes upwardly and away from center of said receiving compartment.

3. The receptacle of claim 1 wherein said engaging boss portions extends downwardly and beyond said elongated horizontal arm member; said fastening agent is inserted through respective openings in said engaging boss portion of said undersurface of said bowl, said elongated horizontal arm member, and said leveling device; said locking mechanism is insertede through respective openings in said engaging boss portion of said undersurface of said bowl and positioned under said horizontal arm member, whereby said bowl is held in said horizontal position; whereby removal of said locking mechanism allows said bowl to pivot forward and away from said elongated vertical support member, using said fastening agent as pivotal point, as a means to ease the empting and cleaning process of said bowl.

4. The receptacle of claim 1 wherein said means for attaching includes a mounting apparatus; said elongated horizontal arm member extends back towards said elongated vertical support member and engages with said mounting apparatus.

5. The receptacle of claim 4 wherein said means for attaching further includes a belt equipped with a buckle at one end, said belt joined to said mounting apparatus, said belt horizontally encircling said elongated vertical support member, and said buckle receiving and securing oppostie end of said belt.

6. The receptacle of claim 5 wherein said means for attaching further includes a second mounting apparatus, and wherein said leveling device is elongated and extends downwardly and diagonally back towards said elongated vertical support member and engages with said second mounting apparatus.

7. The receptacle of claim 6 wherein said means for attaching further includes a second belt equipped with a second buckle at one end, said second belt joined to said second mounting apparataus, said second belt horizontally encircling said elongated vertical support member, and said second buckel receiving and securing oppostie end of said second belt.

* * * * *